United States Patent
Murphy et al.

(10) Patent No.: US 12,035,728 B2
(45) Date of Patent: *Jul. 16, 2024

(54) EXTRACTION CELL

(71) Applicant: Starbucks Corporation, Seattle, WA (US)

(72) Inventors: Kieran A. Murphy, Seattle, WA (US); Chelsea L. Rosenkrance, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,263

(22) Filed: Oct. 18, 2021

(65) Prior Publication Data

US 2022/0053966 A1  Feb. 24, 2022

Related U.S. Application Data

(63) Continuation of application No. 15/681,228, filed on Aug. 18, 2017, now Pat. No. 11,154,157.

(51) Int. Cl.
*A47J 31/40* (2006.01)
*A23F 3/18* (2006.01)
(Continued)

(52) U.S. Cl.
CPC .................. *A23F 3/18* (2013.01); *A23F 5/26* (2013.01); *A23F 5/262* (2013.01);
(Continued)

(58) Field of Classification Search
CPC .... A23F 3/16; A23F 3/163; A23F 3/18; A23F 5/24; A23F 5/243; A23F 5/26;
(Continued)

(56) References Cited

U.S. PATENT DOCUMENTS 2,236,059 A  3/1941  Heuser
2,888,349 A  5/1959  Morrow et al.
(Continued)

FOREIGN PATENT DOCUMENTS

EP  2036466 A1  3/2009
EP  2190330 B1  1/2011
(Continued)

OTHER PUBLICATIONS

Coffee Brewing Methods. Cold Brew Coffee, 2017. https://coffee-brewing-methods.com/entity/cold-brew/, for purposes of examination consider printed from the internet on Jun. 21, 2017.
(Continued)

*Primary Examiner* — Erik Kashnikow
*Assistant Examiner* — Bryan Kim
(74) *Attorney, Agent, or Firm* — Knobbe, Martens, Olson & Bear, LLP

(57) ABSTRACT

An upward flow extraction method, apparatus, and extract are disclosed. The upward flow extraction method can comprise loading extraction material into an extraction cell having a bottom portion and a top portion; introducing a first aliquot of extraction medium through the bottom portion of the extraction cell; expelling gas from the extraction cell through the top portion of the extraction cell; closing the top portion of the extraction cell and increasing the pressure in the extraction cell as extraction medium flows into the bottom portion of the extraction cell; stopping the flow of extraction medium into the extraction cell; steeping the extraction material in the extraction medium under pressure to produce an extract; and introducing a second aliquot of extraction medium through the bottom portion of the extraction cell to push extract through top portion of the extraction cell.

10 Claims, 4 Drawing Sheets

(51) Int. Cl.
*A23F 5/26* (2006.01)
*A47J 31/06* (2006.01)
*A47J 31/36* (2006.01)

(52) U.S. Cl.
CPC ....... *A47J 31/0615* (2013.01); *A47J 31/0663* (2013.01); *A47J 31/3671* (2013.01); *A47J 31/0605* (2013.01)

(58) Field of Classification Search
CPC ........ A23F 5/262; B01D 12/00; A47J 31/002; A47J 31/007; A47J 31/057; A47J 31/0573; A47J 31/14; A47J 31/34; A47J 31/18; A47J 31/402; A47J 31/41
See application file for complete search history.

(56) References Cited

U.S. PATENT DOCUMENTS

| | | | |
|---|---|---|---|
| 3,224,880 A | 12/1965 | Ike | |
| 3,607,280 A | 9/1971 | Durchholz et al. | |
| 3,620,758 A | 11/1971 | Friedman | |
| 3,661,774 A | 5/1972 | Masologites | |
| 3,700,466 A | 10/1972 | Bergeron et al. | |
| 3,830,940 A | 8/1974 | Sivetz | |
| 3,928,636 A | 12/1975 | Katz | |
| 4,088,794 A * | 5/1978 | Katz | A23F 5/262 |
| | | | 426/434 |
| 4,254,694 A | 3/1981 | Illy | |
| 4,397,100 A | 8/1983 | Dickey et al. | |
| 4,544,567 A | 10/1985 | Gottesman | |
| 5,302,407 A | 4/1994 | Vetterli | |
| 5,637,343 A | 6/1997 | Ryan, Jr. | |
| 6,062,127 A | 5/2000 | Klosinski et al. | |
| 6,962,725 B2 | 11/2005 | McFadden, Sr. et al. | |
| 7,419,692 B1 | 9/2008 | Kalenian | |
| 7,544,378 B2 | 6/2009 | Yamada | |
| 7,849,784 B2 | 12/2010 | Adler | |
| 8,515,574 B2 | 8/2013 | Studor et al. | |
| 8,770,092 B2 | 7/2014 | Ruckstuhl | |
| 8,940,175 B2 | 1/2015 | Khamizov et al. | |
| 8,997,633 B2 | 4/2015 | Bishop et al. | |
| 9,179,798 B2 | 11/2015 | Albanese | |
| 9,345,359 B2 | 5/2016 | Carmichael | |
| 9,364,115 B2 | 6/2016 | Remo et al. | |
| 9,375,112 B2 | 6/2016 | Norton et al. | |
| 9,480,359 B1 | 11/2016 | Kalenian | |
| 9,877,608 B2 | 1/2018 | Doglioni Majer et al. | |
| 10,034,486 B2 | 7/2018 | Smits et al. | |
| 10,130,898 B2 | 11/2018 | Corey | |
| 10,226,058 B2 | 3/2019 | Ingold | |
| 10,278,533 B2 | 5/2019 | Angell et al. | |
| 10,306,904 B1 | 6/2019 | De Aldecoa Bueno | |
| 10,463,054 B2 | 11/2019 | DeVane | |
| 10,646,066 B2 | 5/2020 | Kim et al. | |
| 10,863,754 B2 | 12/2020 | Ragnarsson | |
| 11,154,157 B2 | 10/2021 | Murphy et al. | |
| 2004/0018273 A1 | 1/2004 | David et al. | |
| 2005/0095341 A1 | 5/2005 | Sher et al. | |
| 2008/0280023 A1 | 12/2008 | Kalenian | |
| 2012/0021108 A1 | 1/2012 | Baumann et al. | |
| 2013/0180407 A1 | 7/2013 | Colleoni | |
| 2014/0109771 A1 | 4/2014 | Nakao et al. | |
| 2015/0282664 A1 | 10/2015 | Savage et al. | |
| 2016/0037961 A1 | 2/2016 | Digiuni | |
| 2016/0270421 A1 | 9/2016 | Gamble | |
| 2016/0270586 A1 | 9/2016 | Corey | |
| 2016/0270587 A1 | 9/2016 | Yu et al. | |
| 2016/0271531 A1 | 9/2016 | Nazzer | |
| 2016/0353761 A1 | 12/2016 | Paul | |
| 2017/0347827 A1 | 12/2017 | Almblad | |
| 2019/0290048 A1 | 9/2019 | Albanese | |
| 2020/0015622 A1 | 1/2020 | Truninger et al. | |
| 2020/0121115 A1 | 4/2020 | Oh | |
| 2022/0007880 A1 | 1/2022 | Murphy et al. | |
| 2022/0408963 A1 | 12/2022 | Murphy et al. | |

FOREIGN PATENT DOCUMENTS

| | | |
|---|---|---|
| EP | 2241228 B1 | 11/2011 |
| EP | 3437526 B1 | 5/2020 |
| JP | 2010-214250 A | 9/2010 |
| WO | WO 2016/164796 A1 | 10/2016 |
| WO | WO 2016/207846 A1 | 12/2016 |
| WO | WO 2020/125644 A1 | 6/2020 |

OTHER PUBLICATIONS

"Caveman Receipts Tait Fletcher shows you how to make Cold Brew from the Caveman Cold Brew Concentrate." (5 pages), for purposes of examination consider printed from the internet on Jun. 20, 2017.

"Pressurised Cold Brewing" http://www.jimseven.com/2010/08/20/pressurised-cold-brewing/,dated Aug. 20, 2010, for purposes of examination consider printed from the internet on Jun. 21, 2017.

* cited by examiner

EXTRACTION CELL

INCORPORATION BY REFERENCE TO ANY PRIORITY APPLICATIONS

This present application is a continuation of U.S. patent Ser. No. 15/681,228, filed Aug. 18, 2017, the disclosure of which is hereby incorporated by reference in its entirety.

BACKGROUND

Field

The present disclosure relates to systems and methods for preparing edible extracts, such as systems and methods for preparing edible extracts from a cold or ambient solvent under pressure.

Description of Certain Related Art

Certain brewed beverages are prepared by extracting seeds, leaves, berries, or other plant matter containing desirable flavors, aromas, or compounds in a suitable solvent. However, the process of extracting the desirable components from the plant matter can be time consuming, and the strength of the final extract is closely related to the proportion of total dissolved solids (TDS) extracted by the solvent. Accordingly, high temperatures are often employed to increase the rate of extraction, and reduce the time required to obtain a high TDS. For example, espressos are commonly prepared by extracting roasted, ground coffee beans in near-boiling water at high pressure. Other techniques require multiple rounds of extraction to increase the yield of the extraction process. However, high temperatures and repeated extractions can sometimes result in undesirable compounds being extracted from the plant material, such as acids and tannins, which can negatively affect the final beverage quality. Conversely, extractions performed at low temperatures often lack the strength of their high-temperature counterparts, exhibiting a lower TDS content. Such extracts may be perceived as "weak," or lacking in flavor, and fail to replicate the intense characteristics of extracts achieved at high temperatures.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure.

DETAILED DESCRIPTION OF CERTAIN EMBODIMENTS

Overview

Figure 1:
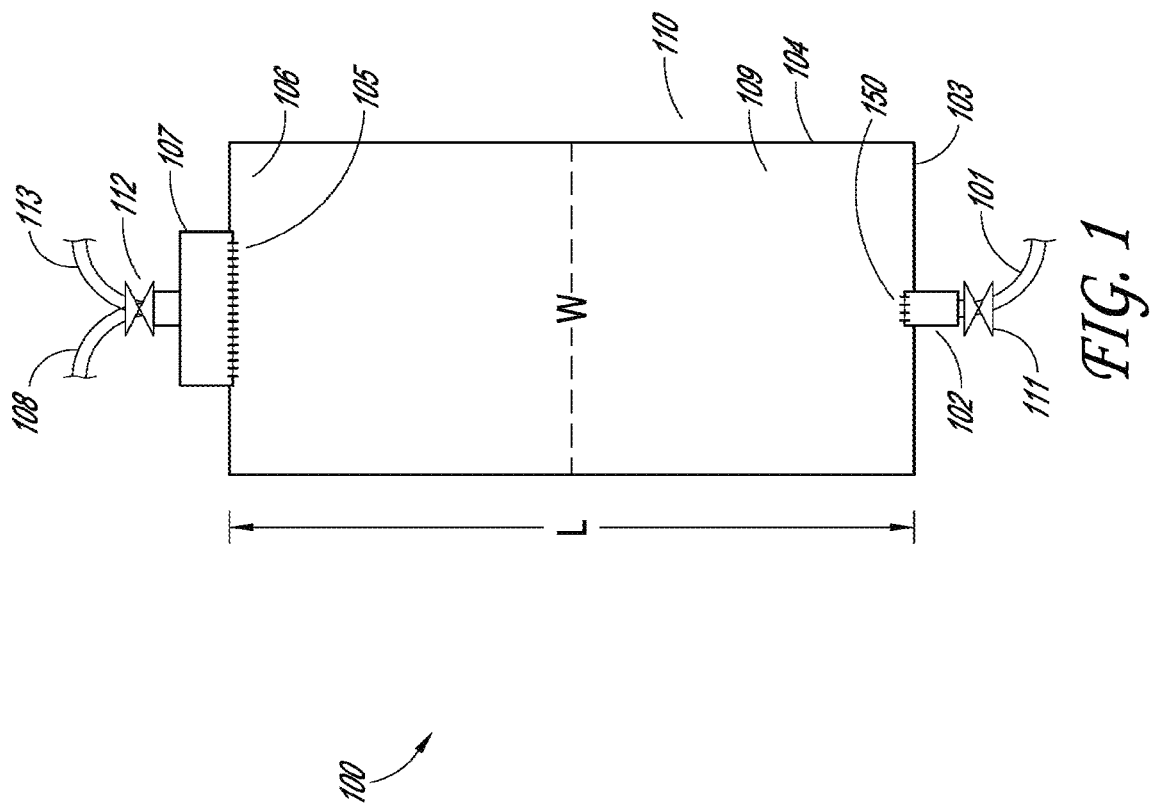
FIG. 1 schematically illustrates an embodiment of an extraction cell.

Various extraction systems and methods are described below to illustrate various examples that may achieve one or more desired improvements. These examples are only illustrative and not intended in any way to restrict the general disclosure presented and the various aspects and features of this disclosure. The general principles described herein may be applied to embodiments and applications other than those discussed herein without departing from the spirit and scope of the disclosure. Indeed, this disclosure is not limited to the particular embodiments shown, but is instead to be accorded the widest scope consistent with the principles and features that are disclosed or suggested herein.

Many of the embodiments described herein involve extracting coffee beans to yield a coffee extract. For instance, in some embodiments, the material to be extracted also referred to herein as the "extraction material" may be coffee. The coffee used can be any variety or species from any part of the world. For example, Arabica, and any blend of Arabica from any part of the world (such as Brazil, Indonesia, Central America, Africa, etc.). In some embodiments, the extraction material may be an edible substance and may also be, in whole or in part, at least one of green coffee cherries, red coffee cherries, coffee flowers, coffee cherry pulp, coffee cherry stalk, coffee cherry exocarp, or coffee cherry mesocarp. However, it should be appreciated that certain features and aspects of the embodiments disclosed herein may be applicable to other beverages besides coffee extracts, such as teas and other similar infusions. For example, in yet other embodiments, the extraction material may be green tea leaves and/or partially or totally dehydrated tea leaves. In still further embodiments, the extraction material may comprise fruits, nuts, or similar plant matter including vanilla beans, chocolate beans, hazelnuts, almond, macadamia, peanut, cinnamon, mint, apple, apricot, aromatic bitters, banana, blackberry, blueberry, celery, cherry, cranberry, strawberry, raspberry, juniper berry, brandy, cachaca, carrot, citrus, lemon, lime, orange, grapefruit, tangerine, coconut, menthol, ginger, licorice, milk, pecan, pistachio, walnut, peach, pear, pepper, among others. Thus, the description herein is not limited to espresso, coffee, coffee products, tea or tea products.

Likewise, certain implementations of the systems, methods, and compounds described herein refer to cold extracts. In certain configurations, cold extracts may be coffee extracts, tea extracts, and herbal extracts, among others. Moreover, this term is applied broadly to refer to extracts prepared with the use of an extraction medium (also referred to herein as solvent) not exceeding 100° C. In certain embodiments, the cold extract can be created during a process that does not utilize pressures exceeding 16 bar(g). For instance, in certain configurations described herein, the extraction medium may be between about 0° C. and about 100° C. In certain embodiments, the temperature of the extraction medium may be between about 10° C. and about 30° C. In certain implementations, the extraction medium can be a liquid such as water but in certain implementations the extraction medium can be other liquids. In additional configurations, certain inert gasses may be used as well to displace the extraction medium. In certain implementations, the extraction medium is at ambient temperatures when added to the extraction cell as described below. In certain embodiments, the process for forming the cold extract can be conducted at a pressure can be between about 0 bar (gauge) and 16 bar(gauge) and in certain configurations, the pressure can be between about 0.8 bar(gauge) and 3 bar (gauge) and in certain embodiments these pressures ranges can be used in combination with the temperature ranges described above.

Although certain aspects, advantages, and features are described herein, it is not necessary that any particular embodiment include or achieve any or all of those aspects, advantages, and features. For example, some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable.

Example Embodiment Extraction Cell

FIG. 1 schematically illustrates an embodiment of an extraction cell 100. To facilitate presentation, the extraction cell 100 is frequently described in the context of an extraction material in the form of tea leaves or ground coffee beans to brew a tea or coffee extract with an extraction medium that is water. However, as noted above, certain features and aspects of the present disclosure can be applied in other contexts as well. For instance, the extraction cell 100 may also be used for extracting tea leaves to brew a tea extract, or other similar infusions or other extraction materials or extraction mediums can be used in certain arrangements.

As shown, the extraction cell 100 of FIG. 1 includes a first portion 103, and a second portion 106. In the illustrated embodiment, both the first portion 103 and the second portion 106 are cylindrical. Joining the first portion 103 to the second portion 106 is a sidewall 104 such that the extraction cell 100 can have a cylindrical shape. In this manner, the first portion 103, the second portion 106, and the sidewall 104 serve to define a boundary between an exterior 110 of the extraction cell 100 and an interior 109 of the extraction cell 100, thereby forming a generally liquid tight enclosure that may be filled with a desired extraction material and a suitable extraction medium to form an extraction slurry. In the illustrated embodiment, the first portion 103 corresponds to a lower or bottom portion of the extraction cell 100 while the second portion 106 corresponds to an upper or top portion of the extraction cell 100. Accordingly, in the description herein the first portion 103 can also be referred to as the bottom portion or lower portion. In a similar manner, the second portion 106 can be referred to as the top portion or upper portion. As will be explained below, the illustrated arrangement has certain advantages. For instance, in some configurations, the second portion 106 may be removed either partially or completely to facilitate the introduction of a desired extraction material. For instance, in certain configurations, the second portion 106 may be implemented as a removable cover, sliding window, or flip top lid, though various other implementations are may be used. Moreover, in certain arrangements, the orientation of the extraction cell 100 can be modified such that the orientation of the first portion 103 and the second portion 106 are reversed or located in other positions such as positioning the extraction cell 100 on its side such that the first portion 103 and the second portion 106 are located at the same or near the same elevation. Thus, in certain configurations, at least one of the first portion 103, or sidewall 104 may be implemented as a removable cover, or equipped with a mechanism configured to create an opening through which an extraction material can be loaded into the interior 109 of the extraction cell 100.

The interior 109 of the extraction cell 100 can be characterized by a length L and an average width W along the length L. The length L and average width W of the extraction cell define an interior aspect ratio AR (aspect ratio=L/W) of the extraction cell 100. The interior aspect ratio AR of the extraction cell can allow a user to control the contact ratio of the extraction material in relation to the extraction medium. The contact ratio of the extraction material to the extraction medium can affect the extraction characteristics—an increased contact ratio resulting in shorter extraction times, and producing stronger extracts. Thus, the overall size of the extraction cell 100 may be increased, decreased, or otherwise altered to suit particular production needs, without significantly impacting extraction characteristics, as long as the interior aspect ratio AR of the extraction cell is reasonably maintained. In some embodiments, the interior aspect ratio AR may range from about 1:1 to about 10:1. For instance, in certain configurations the interior aspect ratio AR may range from about 2:1 to about 4:1 or any value about or between the foregoing ranges.

The extraction cell 100 can be configured to induce plug flow. The term plug flow is used in accordance with its plain and ordinary meaning, referring to a fluid transport model wherein a constant flow velocity is maintained across the radial axis of the chamber. Due to the substantially constant velocity of flow, mixing between adjacent fluid layers is substantially avoided. In this manner, a first aliquot of extraction medium may be expelled from a chamber by a second aliquot of liquid without substantial mixing. For instance, in certain embodiments of the present disclosure, the contents of the extraction cell 100 are expelled by initiating a flow of extraction medium through the first portion 103. Where the extraction medium achieves a constant velocity across the width of the interior of the extraction cell 100, a plug flow can be induced, and the contents of the extraction cell 100 (i.e., the prepared extract) may be expelled from the extraction cell 100. Since the extraction medium can exhibit a substantially constant velocity across the width of the extraction cell 100, undesirable mixing between the flow of extraction medium and the prepared extract of the extraction cell 100 can be avoided, and the prepared extract will not be diluted by the second flow of extraction medium.

The extraction cell 100 may be made from any suitable material. For instance, the first portion 103, the second portion 106, and the sidewall 104, may each independently comprise a metal, ceramic, plastic, glass, or other substantially solid compound. For instance, in some configurations, the first portion 103, the second portion 106, and the sidewall 104, may be constructed from a substantially opaque metallic compound. In additional configurations, at least the sidewall 104 may be comprised of a substantially transparent or at least partially translucent compound, such as a glass or plastic. Advantageously, in such configurations, it may be possible for a user to view the contents of the extraction cell 100 and to determine the progress of the extraction based on the appearance of the contents residing within.

With continued reference to FIG. 1, in the illustrated embodiment, the first portion 103 includes an inlet 102 to allow an extraction medium to be introduced into the extraction cell 100 through the first portion 103 (which as explained above can be the bottom portion 103). The inlet 102 can be a generally hollow section of piping or tubing serving to produce an opening in the first portion 103. The inlet 102, in turn, can be in fluid communication with an inlet conduit 101. The inlet conduit 101 may similarly comprise a generally elongate, hollow section of piping or tubing serving to provide a path for the flow of a extraction medium (such as water or gas) towards the inlet 102 from any suitable source. In this manner, the inlet conduit 101 is in fluid communication with the interior 109 of the extraction cell 100 through the inlet 102. Thus, a supply of water—or any other extraction medium—may be introduced into the interior 109 of the extraction cell 100 through the first portion 103. While one inlet is illustrated, more than one inlet can be used or the inlet can be divided into sub-inlets.

One or more inlet valves 111 may be disposed along the inlet conduit 101 and/or at the inlet 102. In this manner, it is possible to control the flow of extraction medium into the interior 109 of the extraction cell 100. Suitable valves include, for instance, umbrella valves, duckbill valves, or any other suitable temporary closure mechanism. By modulating the inlet valves 111, the flow of water into the interior 109 of the extraction cell 100 may be initiated, halted, regulated, or otherwise controlled depending on the desired extraction characteristics. Likewise, in some configurations, the inlet conduit 101 may be fitted with a suitable valve or filter to serve as a backflow inhibitor. Thus, it is possible to prevent plant material, solvent, or even the extract itself from flowing back through the inlet 102 towards the inlet conduit 101, even if the contents of the extraction cell are subjected to substantial back-pressure. For instance, in the embodiment illustrated in FIG. 1, the inlet 102 can be fitted with a coarse filter 150. In this manner, extraction material can be prevented from flowing back towards the inlet conduit 101. In certain configurations, the coarse filter 150 may have a mean aperture diameter ranging from about 0.3 mm to about 1 mm.

As shown in FIG. 1, the second portion 106 can also include an outlet 107. As with the inlet 102 discussed above, the outlet 107 can be in fluid communication with an extract outlet conduit 108. In some configurations, the outlet 107 may further be coupled with an air outlet conduit 113, as illustrated in FIG. 1. In this manner, both the extract outlet conduit 108, and air outlet conduit 113 are in fluid communication with the interior 109 of the extraction cell 100, thereby providing a path for both the air and extract residing within the interior 109 of the extraction cell 100 to be displaced or otherwise removed from the interior 109 of the extraction cell 100 through the second portion 106 of the extraction cell 100. In certain arrangements, separate conduits and outlets can be provided on the second portion 106 to provide a path for both the air and extract residing within the interior 109 of the extraction cell 100 and/or more than one outlet can be provided and/or the outlet can be divided into sub outlets. To prevent or control the expulsion of extract or air from the interior 109 of the extraction cell 100, one or more outlet valves 112 may be disposed within the outlet 107, the extract outlet 108, or the air outlet 113. The outlet valves 112 may also be used to prevent or control the expulsion of air from the interior 109 of the extraction cell 100. The one or more outlet valves 112 may include an umbrella valve, a duckbill valve, or other suitable temporary closure mechanism. In this manner, the flow of extract and/or air from the interior 109 of the extraction cell 100 may be initiated, halted, regulated, or otherwise controlled depending on the desired extraction characteristics.

In certain configurations, at least one of the inlet valves 111, and the outlet valves 112 may be communicably coupled with a controller as will be described in more detail with reference to FIG. 4. The controller may be manipulated by a user directly, or the controller may be communicably coupled with a user interface. In this manner, a user and/or a control system of the extraction cell 100 may manipulate the inlet valves 111 or outlet valves 112 to adjust certain extraction characteristics. For instance, in some embodiments, a user and/or control system of the extraction cell 100 may close the outlet valves 112 while the flow of solvent persists, thereby causing pressure within the interior 109 of the extraction cell 100 to build, and thus increasing the rate of extraction.

In the illustrated embodiment, the second portion 106 can comprise a filter 105. The filter 105 can separate heterogeneous extraction slurry into its constituent components to yield a substantially homogeneous extract. The filter 105 can be positioned near or adjacent to the outlet 107. In certain configurations, the filter 105 shares substantially the same size and geometry as the outlet 107. The resultant extract may then be isolated and/or reserved for further processing, packaging, or consumption. The filter 105 may be any suitable filtration construction. For instance, in certain configurations the filter 105 may be a fine filter, mesh filter, membrane filter, or other suitable filtration apparatus. Moreover, in certain configurations, the filter 105 may be selected such that the aperture size or pore size will capture the extraction material without adversely impacting the flow of the extract as the mixture flows towards the water outlet conduit 108. Alternatively, the aperture size of the filter 105 can be selected such that the flow of extract out of the extraction cell 100 is significantly impeded. In this manner, significant back pressure may be built within the interior 109 of the extraction cell 100 as additional aliquots of extraction medium are flowed into the interior 109 of the extraction cell 100 through inlet 102, even when outlet 107 and extract conduit 108 are opened, or otherwise configured to receive a flow of extract. In some implementations, the filter 105 may have a mean aperture diameter ranging from about 0.01 mm to about 1 mm. For instance, in certain configurations, the filter 105 has a mean aperture diameter ranging from about 0.05 mm to about 0.35 mm. In certain configurations, the filter 105 has a mean aperture diameter of about 0.10 mm.

Figure 3:
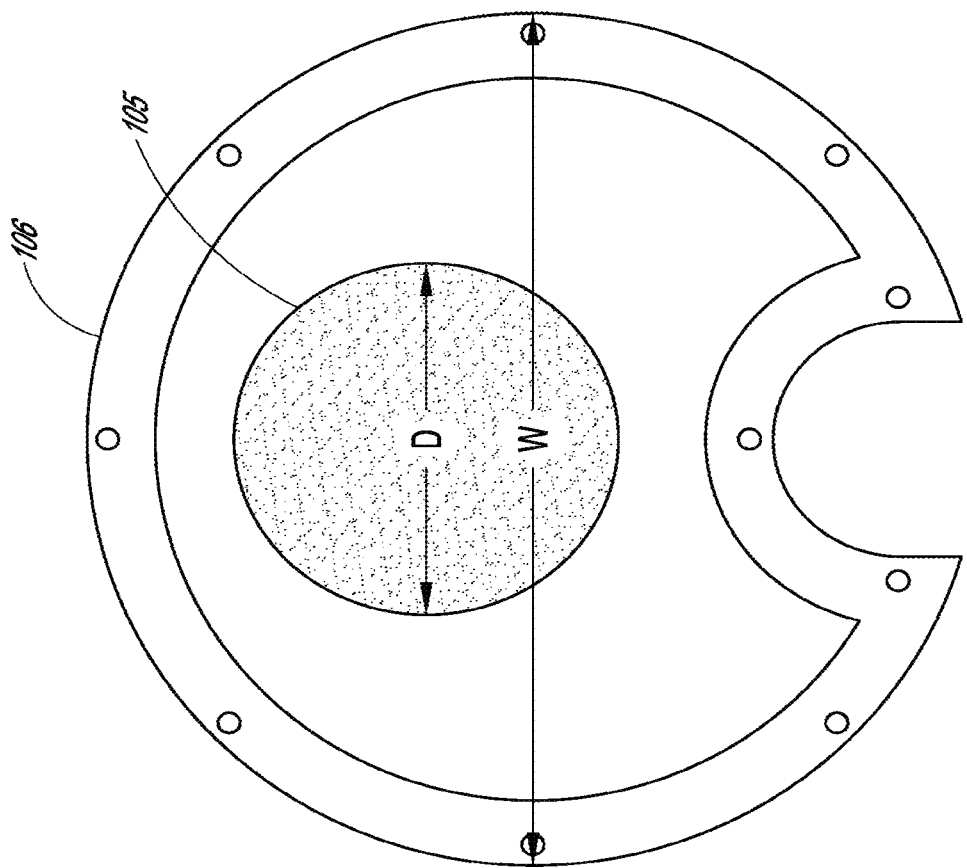
FIG. 3 schematically illustrates an interior view of the second portion and filter of the extraction cell of FIG. 1.

FIG. 3 depicts an interior view of an embodiment of the extraction cell's 100 second portion 106. As can be seen in FIG. 3, the filter 105 can be disposed adjacent to the outlet such that the filter 105 covers the outlet substantially completely. In this manner, the spent coffee grounds may be separated from the extraction slurry such that only the substantially homogenous extract is permitted to flow through the filter 105, into the outlet, and towards the extract outlet conduit. In certain configurations, the filter 105 can have a diameter D that is approximately 20% of the W interior 109 of the extraction cell 100. In some embodiments, the diameter D of the filter is substantially equal to the diameter D of the outlet. Nevertheless, the diameter D of the filter 105 may be modified to accommodate the desired extraction characteristics. For instance, in certain configurations, the diameter of the filter 105 may be increased to reduce the back pressure exerted on the contents of the extraction cell. Alternatively, in certain configurations, the diameter D of the filter 105 may be reduced to slow the rate at which the extract may be displaced from the interior 109 of the extraction cell 100. The diameter of the filter 105 may be modified in isolation. However, in certain configurations, the diameter of the filter 105 may be modified in conjunction with corresponding modifications to the diameter of the outlet. For example, in certain configurations the diameter D of the outlet and the filter 105 may have a diameter substantially equal to or equal to the diameter of the interior 109 of the extraction cell 100. In such an embodiment, the ratio diameter D of the outlet and of the filter diameter to the cell diameter would both be about 1:1. However, modified configurations may be implemented. For instance, in certain configurations, the diameter D of the outlet and the filter diameter may both be about 10% to about 100% of the cell inner diameter and in certain configurations about 10% to about 30% of the cell inner diameter. Likewise, the location of the filter 105 with respect to the second portion 106 may be varied. For instance, the filter 105 may be disposed substantially centered on the second portion 106. In alternate embodiments, the filter 105 may be offset such that the outer circumference of the filter intersects with the center of the second portion 106.

Additionally, the interior 109 of the extraction cell 100 may be fitted with one or more sensors to monitor the internal characteristics of the extraction cell 100. For instance, in certain configurations, the interior 109 of the extraction cell 100 may include a temperature sensor, which allows the user to monitor the temperature of the contents residing within the interior 109 of the extraction cell 100. Moreover, in certain configurations, it may be advantageous to dispose multiple pressure sensors within the interior 109 of the extraction cell 100 such that the internal pressure can be monitored. In certain configurations, the one or more sensors may be coupled with the controller to automate certain aspects of the extraction. For instance, in some configurations, a pressure sensor may be disposed within the extraction cell 100 and communicably coupled with a controller. In this manner, the pressure within the extraction cell 100 may be monitored as the cell fills with extraction medium. Once a desired pressure has been built within the extraction cell 100, the controller may cause the inlet valves 111 to close, halting the flow of extraction medium into the interior 109 of extraction cell 100. As noted herein, in certain embodiment, the flow into and out of the extraction cell 100 can be controlled manually and/or semi-manually.

With reference back FIG. 1, an extraction slurry may be allowed to steep within the interior 109 of the extraction cell 100. In this manner, the desirable compounds of the material to be extracted from the extraction material may be pulled into the extraction medium and dissolved to form an extract. When steeping has completed, the inlet valves 111 can be actuated to initiate a second flow of extraction medium into the interior 109 of the extraction cell 100. As will be discussed in more detail below, the second flow of extraction medium may displace the extract through outlet 107 when outlet valves 112 are actuated and configured to receive a flow of extract from the extraction cell interior 109. Embodiments and/or components the extraction cell 100 can be used in combination with the method described below, for example, with respect to FIGS. 2A-E. In addition, the embodiments and/or components the extraction cell 100 can be used to create cold extracts according to the embodiments described below.

Example Extraction Method

FIGS. 2A-E schematically illustrate an embodiment of an upward flow filtration process for use in a extraction cell as described above. The extraction cell can be configured according to any of the embodiments described above and herein. Components of the extraction cell 200 in FIGS. 2A-E have been given similar references numbers to the extraction cell 100 described above with similar components preceded by "2" instead of "1" as described above. For example, the interior 209 can correspond in certain embodiments to the interior 109 in the embodiments disclosed above. Additional detail and embodiments of such components with similar reference numbers can be found with reference to description above. To facilitate presentation, the methods below are discussed in the context of preparing a cold extraction of coffee or tea, from roasted ground coffee beans and loose leaf teas of packed tea pellets. However, it will be apparent to the skilled artisan that the methods may be employed to prepare a variety of different brews, including teas and various other infusions. As noted above, the process can include the use of an extraction medium (also referred to herein as solvent) not exceeding 100° C., and without using pressures exceeding dozens of atmospheres. For instance, in certain configurations described below, the extraction medium may be between about 0° C. and about 100° C. In some embodiments, the temperature of the extraction medium may be between about 10° C. and about 30° C. In certain embodiments, the pressure within the extraction chamber is between about 0 and 16 bar(g). In certain configurations, the pressure is between about 0.8 and 3 bar(g). In certain configurations, the temperature and pressure ranges mentioned above can be combined. In certain implementations, the extraction medium can be a liquid such as water but in certain implementations the extraction medium can be other liquids. In additional configurations, certain inert gasses may be used as well to displace the extraction medium. In certain implementations, the extraction medium is at ambient temperatures when added to the extraction cell as described below.

Figure 2:
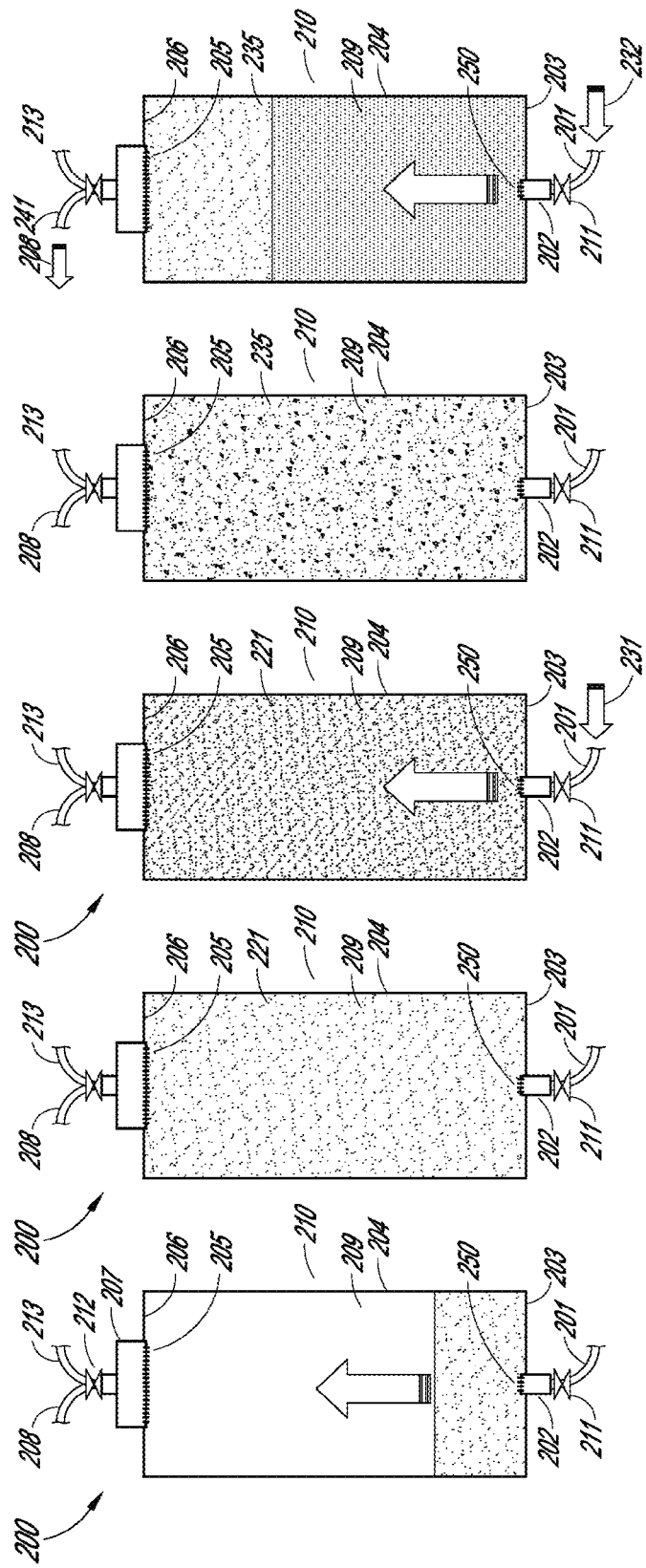
FIGS. 2A-E schematically illustrate an embodiment of a method of preparing an extract in an extraction cell.

As shown in FIG. 2A, extraction material 221, which can be roasted, ground coffee bean, can be loaded into the interior 209 of the extraction cell 200. The extraction material 221 may be added until the interior 209 of the extraction cell 200 is filled partially or substantially completely. As discussed above, the extraction material 221 can vary broadly within the context of this disclosure. For instance, in certain configurations the extraction material 221 may comprise coffee beans, such as roasted, ground coffee beans. In addition, the level of grind can also affect extraction characteristics. For instance, in certain configurations, extraction proceeds more quickly when finely ground coffee beans are used. Alternatively, the rate of extraction can be slowed where coarser grinds are employed. In some embodiments, the coffee beans may be ground to a mean particle diameter of about 0.5 mm to about 3 mm. For instance, in certain configurations, the coffee beans may be ground to a mean particle diameter of about 1 mm to about 2 mm. In yet further embodiments, the ground coffee beans may be ground to a mean particle diameter of about 1.2 mm to 1.7 mm. In certain configurations, the beans may be ground to a mean particle diameter of about 1.3 mm. However, additional or alternate extraction materials may also be used. For instance, in certain configurations the fruits, leaves, roots, and/or bark of other plants and herbs may be extracted.

FIG. 2B depicts the exemplary extraction cell 100 filled substantially completely with the extraction material 221. After the extraction material 221 has been loaded into the extraction cell 200, a first aliquot 231 of an extraction medium may be introduced, as depicted in FIG. 2C. As with the extraction material 221, a wide variety of potential extraction mediums can be employed. To facilitate presentation, the present disclosure frequently refers to the use of water as the extraction medium, though it will be apparent to the skilled artisan that additional, or alternate extraction mediums such as gas, can be used in the methods disclosed herein.

FIG. 2C depicts a first aliquot 231 of extraction medium flowing into the interior 209 of the extraction cell 200 through the first portion 203. In some embodiments, the extraction medium may be water. As noted above, in certain embodiments, the extraction medium, which can be water, does not exceed 100° C. and in certain configurations the extraction medium may be between about 0° C. and about 100° C. and in some embodiments, the temperature of the extraction medium may be between about 10° C. and about 30° C. As shown in FIG. 2C, the first aliquot 231 of extraction medium flows from the inlet conduit 201, through the inlet 202, and into the interior 209 of the extraction cell 200. In the illustrated arrangement, the first aliquot 231 of extraction medium flows generally upwards into the interior 209 of the extraction cell 200, first permeating the lowest layers of the extraction material 221 before proceeding vertically throughout the extraction cell 200.

As the first aliquot 231 of extraction medium flows into the interior 209 of the extraction cell 200, the extraction material 221 of the extraction cell 200 can be pressed towards the second portion 206. This includes the extraction material to be extracted, as well as any gasses resident within the interior 209 of the extraction cell 200. In some embodiments, the outlet 207 may be opened such that the upward flow of the extraction medium expels gases (such as air) resident in the extraction cell 200 through second portion 206, through the outlet 207, and towards the air conduit 213. Once sufficient air has been expelled from the extraction cell 200, the outlet 207 may be closed.

Once the outlet 207 is closed, the flow of extraction medium can be halted, or allowed to persist for a period of time. The pressure within the interior 209 of the extraction cell 200 can be related to the amount of time the flow of extraction medium is allowed to persist after the outlet 207 has been closed. The longer the flow of extraction medium is allowed to persist, the greater the pressure within the interior 209 of the extraction cell 200 will be, and the more rapidly the extraction will proceed. Conversely, to achieve a more delicate extraction, the outlet 207 can be closed as the flow of water is halted such that the contents of the extraction cell 200 are maintained at approximately atmospheric pressure.

In addition to displacing the resident air, the upward flow of extraction medium can provide certain advantages. First, the upward flow of extraction medium can more evenly wet the extraction material 221 within the extraction cell 200. Even wetting of the extraction material 221 can facilitate even extraction, preventing regions of the extraction material 221 from over-extracting while other regions remain under-extracted.

Second, the upward flow of the extraction material 221 can tamps the extraction material 221 against the second portion 206 of the interior 209 of the extraction cell 200. In this manner, efficient and autonomous extraction is facilitated by eliminated the need for additional tamping components or user intervention. Since the upward flow of the extraction material 221 provides the requisite tamping force, an extraction process may be initiated and left unattended, without requiring a user to stand by and tamp the coffee grounds after they have been loaded in the extraction cell, or after the extraction solvent has been introduced. Moreover, the degree to which the grounds are tamped can be controlled by the modulating amount of solvent introduced into the extraction cell, and thus, the internal pressure induced by the solvent.

Third, tamping of the extraction material 221 against the second portion 206 can aid even extraction. Since the extraction material 221 is tamped against the second portion 206 of the extraction cell 200 and compacted, the risk of channeling is reduced. Channeling can occur where the interstitial spaces between extraction material 221 are irregular; as the extraction medium flows through the coffee extraction material 221, the extraction medium may be diverted towards larger interstitial spaces. This phenomena may lead to over-extraction of the extraction material 221 adjacent to larger interstitial spaces, and under-extraction of the extraction material 221 adjacent to smaller spaces. Moreover, such channeling can inhibit plug flow formation by preventing or reducing the flow of extraction medium from achieving or maintaining a substantially constant velocity. Conversely, where an even, upward flow of extraction medium is employed, the extraction material 221 can tamped against the second portion 206 of the extraction cell 200, compressing the grounds into a cake. The compressed extraction material 221 exhibits more uniform interstitial spacing, facilitating uniform extraction, and yielding an extract having more refined flavor characteristics.

The user may control many aspects of the extraction process by tailoring the flow rate to suit a particular embodiment. For instance, the internal pressure—and the degree to which the extraction material 221 are tamped against the second portion 206—can be dependent on the rate at which extraction medium is introduced into the interior 209 of the extraction cell 200.

In various embodiments, flow rates are set to achieve plug flow. Where a given flow rate is too high, the extraction solvent can exploit irregularities within the interstitial spaces of the coffee grounds to form channels through the cake. Such channels can be associated with uneven extraction. Similarly, where the flow rate is too low, the velocity of solvent can be insufficient to induce plug flow. As such, the desired flow rate can be affected by the geometry of the extraction cell, and the contents residing therein. Accordingly, in various configurations of the methods and devices described herein, the flow rate is gauged in relation to the volume of the first aliquot of extraction medium residing within the interior of the extraction cell. For instance, in certain configurations, the flow rate may be configured to fill the available volume of the extraction cell over a period ranging from 3 to 30 minutes. Likewise, the flow rate may be configured to displace about 30 to about 90% of the first aliquot over a period ranging from about 3 to 30 minutes. In alternate configurations, the flow rate may be configured to displace about 90% of the volume of the first aliquot over a 5 minute period. In certain configurations, the flow rate may be configured to displace about 30 to about 90% of the volume of the first aliquot over about 5 minute to about 30 minute period. However, various other flow rates may be implemented within the scope of this disclosure. For instance, in certain configurations, the flow rate may be configured such that about 60% to about 80% of the volume of the first aliquot of extraction medium is displaced over a period of time ranging from about 15 minutes to about 20 minutes.

As the first aliquot 231 of water flows into the interior 209 of the extraction cell 200, an extraction slurry 235 is formed. FIG. 2D depicts the extraction slurry 235 residing within an extraction cell 200. The extraction slurry 235 is typically a heterogeneous mixture comprising the extraction material to be extracted in solution with the extraction medium. For instance, in certain configurations, the extraction slurry may comprise roasted, ground coffee beans in solution with water. The strength of the resultant extract is affected by certain characteristics of the extraction slurry 235. For instance, the ratio of roasted, ground coffee beans to water has an effect on the final strength of the brewed extract. Similarly, the temperature of the extraction slurry 235, as well as the pressure under which it is maintained all have a similar effect on the ultimate beverage characteristics, as will be discussed in more detail below.

As shown in FIG. 2D, the extraction slurry 235 can maintained within the interior 209 of the extraction cell 200 to steep. The extraction slurry 235 may be steeped for a period of time ranging from about 1 minute to about 2 hours. For instance, in certain configurations, the extraction slurry 235 may be permitted to steep for about 30 minutes to 1 hour. In some embodiments, the extraction slurry 235 is steeped for about 45 minutes. However, steeping times will vary broadly depending on the nature of material being extracted, and the desired characteristics of the extract to be obtained. For instance, shorter steeping times may be employed to prepare more delicate infusions, such as herbal teas. Additionally, longer steeping times may be employed to prepare beverages having deeper, bolder flavors, or where the desirable compounds have poor solubility, or are otherwise difficult to extract. In certain embodiments, the pressure within the extraction chamber during the steeping periods described above can be between about 0 bar(g) and 16 bar(g). In certain configurations, the pressure during steeping period described above can be between about 0.8(g) and 3 bar(g). In certain embodiments, a vacuum may be induced to reduce the internal pressure below ambient. For instance, in certain configurations, the pressure during the steeping period may be between about −3 bar(g) and about 3 bar(g). Additionally, in certain embodiments, during the steeping periods described above, the extraction slurry 235 does not exceed 100° C. and in certain configurations extraction slurry 235 is between about 0° C. and about 100° C. and in some embodiments, the temperature of the extraction slurry 235 may be between about 10° C. and about 30° C. Surprisingly, due to the geometry of the extraction cell and the upward flow filtration process described herein, a high proportion of the desirable soluble compounds within the extraction material are drawn into the extraction medium, ultimately allowing for the production of high TDS extracts without sacrificing yield even when shorter extraction times, such as about 30 minutes, are employed.

The extraction slurry 235 is typically maintained at a substantially constant temperature and pressure throughout the process, though some variations are contemplated. For instance, in certain configurations, the first aliquot 231 may have at temperature below ambient temperatures. In such configurations, the extraction cell may be maintained at a low temperature, or the temperature of the first aliquot may be allowed to rise as it steeps within the extraction cell. In alternate embodiments, the temperature of the extraction slurry may be decreased as the mixture steeps. In still further embodiments, the temperature of the extraction slurry may be increased as the mixture steeps. In certain configurations, the temperature of the first aliquot 231 may be about 0° C. to about 100° C. In certain configurations, the temperature of the first aliquot 231 may be about 10° C. to about 30° C.

Likewise, as the extraction slurry 235 steeps, the pressure within the extraction cell is typically maintained until the steeping process has completed. For instance, in certain configurations the first aliquot of water may be flowed into the interior 209 of the extraction cell 200 until the internal pressure exceeds one atmosphere. Once the desired pressure has been built, the inlet valves may be closed and the first flow may be halted. The pressure within the extraction chamber may then be maintained at a substantially constant level as the extraction slurry steeps. In certain embodiments, the pressure within the extraction chamber is between about 0 and 16 bar(g). In certain configurations, the pressure is between about 0.8 and 3 bar(g).

After the extraction slurry has steeped, extract 241 can retrieved from the extraction cell 200. As depicted in FIG. 2E, the extract 241 can be displaced by flowing a second aliquot 232 of extraction medium (which may or may not be the same type of medium used during the extraction step) into the interior 209 of the extraction cell 200. The second aliquot 232 of extraction medium flows upwards from the first portion 203, displacing the contents of the extraction cell 200 upwards towards the filter 205. The filter 205 serves to separate the heterogeneous extraction slurry 235 into its constitutions: the steeped extract 241 and the spent extraction material 221. Specifically, the inlet valve 211 can be opened, and a second aliquot 232 of extraction slurry 235 allowed to flow through the inlet conduit 201 into the interior 209 of the extraction cell 200 via the inlet 202.

In various configurations of the methods and devices described herein, the flow rate of the second aliquot gauged in relation to the volume of the first aliquot of extraction medium residing within the interior of the extraction cell. Likewise, in certain configurations a given flow rate will depend on the size of the extraction cell, the particle size of the material to be extracted, the diameter of the filter, and the aperture size of the filter. Accordingly, in certain configurations, the flow rate of the second aliquot may be configured to displace about 30% of the first aliquot over a 30 minute period. In alternate configurations, the flow rate may be configured to displace about 90% of the volume of the first aliquot over a 5 minute period. In certain embodiments, the flow rate of the second aliquot may be configured to displace about 30% to about 90% of the first aliquot over a about 5 to about 30 minute period. However, various other flow rates may be implemented within the scope of this disclosure. For instance, in certain configurations, the flow rate may be configured such that about 60% to about 80% of the volume of the first aliquot of extraction medium is displaced over a period of time ranging from about 15 minutes to about 20 minutes.

Due to the flow rate, the cylindrical nature of the illustrated embodiment of the extraction cell 200, and the back pressure induced by the outlet valves 2122 and filter 205, a plug flow can be induced as the second aliquot 232 of extraction medium is introduced into the interior 209 of the extraction cell 200. As discussed above, a plug flow is characterized by a substantially constant velocity across the radial profile of the extraction cell 200. The substantially constant velocity across the radial profile of the extraction cell can inhibit mixing adjacent layers—specifically, between the second aliquot 235 of extraction medium and the steeped extract 241.

Displacing the extract 241 in this manner can increase efficiency because additional equipment is not required to remove the extract from the interior 209 of the extraction cell 200; displacing the extract simply utilizes the network of inlets and outlets used previously to introduce the extraction medium. Thus, the steeped extract 241 can be expelled from the extraction cell 200 without undue dilution, and without necessitating additional retrieval procedures or components. Lacking superfluous retrieval conduits or mechanisms, consequential transfer losses are reduced, thus ensuring that high extraction yields may be maintained.

The extraction cycle is complete once the desired volume of extract 241 is collected. In certain embodiments, the cycle may begin again by steeping the extraction material in the second aliquot of water. In other embodiments, the extraction material is discarded and the extraction cell 200 emptied so that the cycle may begin anew. The extract 241 can be finished product that can be delivered to a consumer for consumption. According to certain embodiments, at least a portion of the extract 241 is delivered to the consumer for consumption after only a single pass through the extraction material 221. As noted above, embodiments of the extraction methods can be used in combination with the extraction cell 100 described above with respect to FIGS. 1 and 3. In addition, the embodiments of the extraction method described with respect to FIGS. 2A-E above can be used to create cold extracts according to the embodiments described below.

Cold Extracts

Preparing an edible extract can be a time consuming process. The process of extraction includes pulling desirable compounds contained within a material of interest into an extraction medium. Extracts can be characterized by the concentration of dissolved compounds within the extraction medium, often measured as TDS (total dissolved solids). However, depending on the solubility of the desirable compounds, the process of extraction can often takes hours or even days. As such, traditional methods employ high temperatures to increase the rate of extraction and reduce the time required to prepare a brewed beverage. However, high temperatures can increase the rate at which undesirable components are extracted from the plant material, which can impart off flavors, or other undesirable characteristics.

Although extractions may be performed at lower temperatures, however, such efforts often result in weak, watery extracts lacking the flavor and aroma of brews that are prepared in accordance with traditional methods due to the abundant presence of unsteeped water and the lower TDS content and can also require large amount of extraction material resulting in poor yields. By way of example, traditional hot espressos prepared at high temperatures and pressures exhibit a TDS content of about 50-70 g/L, in contrast with cold brew preparations having a TDS content of about 20-40 g/L.

Subjecting the material to multiple rounds of extraction in an attempt to increase TDS content or yields can be similarly ineffective or lead to undesirable results. Yield is generally related to TDS according to Equation 1.

$$\% \text{ Yield} = \frac{TDS * \text{Extract Volume}}{\text{Extraction Material Mass}} \times 100 \quad \text{Equation 1}$$

Given the above relationship, manufacturers may attempt to increase their yield by repeatedly extracting the same mass of coffee beans, increasing the total extract volume without increasing the mass of extracted material. Thus, the total yield is artificially inflated.

Conversely, the extract produced according to certain embodiments described can exhibits a high TDS content and high yield, without relying on high temperatures and extreme pressures which are prone to over extracting undesirable compounds. Specifically, the cold extraction preparations described herein are surprisingly concentrated, exhibiting high TDS content without sacrificing overall yield. Moreover, the high TDS content of the cold extracts prepared in accordance with this disclosure do not sacrifice yield, and do not require high temperatures or multiple rounds of extraction which can result in off-flavors and undesirable characteristics.

By way of example, the upward flow process described herein allows the first aliquot of extraction medium to remain in substantially complete contact with the extraction material. As such, extraction proceeds efficiently, with little room for residual extraction material to remain unsteeped. Thus, the resultant extract includes more dissolved solids, and less unsteeped extraction medium in the final product. The absence of unsteeped extraction medium results in a stronger, bolder flavor when compared to traditional cold preparations. Importantly, due to the limited amount of unsteeped extraction medium in the extract, and due to the more intense coffee flavor, high concentration cold extracted coffees and teas may be prepared through the upward filtration cold extraction process described herein. Moreover, due to the upward flow filtration and plug flow displacement process, high concentrations can be achieved without sacrificing overall yield. Surprisingly, due to the high TDS content of the cold extracts, the extracts described herein may be added to a wide variety of beverages. For instance, in certain configurations, the techniques and methods described herein may be used to prepare a beverage which may be consumed by itself, or in conjunction with additional beverage components such as milk, water, or juices to prepare cold brew Americanos, mochas, lattes, cappuccinos, or the like.

The techniques and methods described herein may be used to prepare a cold extract. For instance, in some implementations the extraction material is ground roasted coffee with a mean diameter of about 1 mm to about 2 mm. However, alternate extraction materials, such as loose leaf tea, may also be used. In some configurations, the cold brew extract may have a TDS of about 40 g/L to about 200 g/L. For instance, in certain configurations, utilizing ground roasted coffee as the extraction material, the pressed coffee extract has a TDS of about 60 g/L to about 120 g/L, while in certain embodiments; the pressed coffee extract has a TDS of about 80 g/L to about 120 g/L. In certain embodiments, the cold extract having TDS in the above ranges can be achieved during a cold extraction process and can be achieved with other extraction materials such as loose leaf tea and other extraction materials as mentioned herein. In certain embodiments, the cold extract having TDS in the above ranges can be achieved during a extraction process utilizing ground coffee beans have a mean diameter of between 1 mm and 2 mm. In addition, the extract having a TDS within the above ranges can be achieved in a process that includes a single pass through the extraction material. Surprisingly, such first pass extracts exhibit high TDS and achieve excellent yield. For instance, the extract having a TDS within the above ranges can be achieved in a process that includes a single pass through the extraction material during a cold extraction process exhibiting yields ranging from about 8% to about 14%. In some configurations, the yield may range from about 10% to about 12%. In still further embodiments, the extracts prepared can be prepared with the use of an extraction medium) not exceeding 100° C., and in certain configurations, the extraction medium may be between 0° C. and 100° C. and in certain configurations, the extraction medium may be between 10° C. and 30° C. In the aforementioned configurations, the extraction process can be conducted at pressures between about 0 and about 16 bar(g) and in certain configurations the pressure can between about 0.8 and 3 bar(g). In some implementations, the coffee used to produce the extract is maintained at a temperature less than 50° C. after roasting, until the extract is displaced from the extraction cell. In still further embodiments, the extract medium used to produce the extract is maintained at a pressure between about 0-16 bar(g) after the coffee is introduced into the extraction cell, until the extract is displaced from the extraction cell. In the above configurations the coffee can be exposed to the extraction medium for a period of about 1 minute to about 2 hours and in some embodiments from about 30 minutes to 1 hour. The cold extracts prepared in accordance with this disclosure may exhibit less acidity for a sweeter, smoother flavor in comparison to traditional hot extractions. As such, these extracts are suitable for mixing in a wide variety of beverage bases. For instance, in certain configurations, cold extracts prepared in accordance with this disclosure may be consumed alone, or mixed with additional beverages or ingredients such as milk, citrus, teas, and sparkling sodas. In additional configurations, the cold extract may be isolated and further processed or stored. For example, in some configurations, the cold extract may be delivered into a barrel for aging or storage. In certain configurations, whiskey barrels made from oak, or other suitable woods may be used for storage and aging.

TDS can be measured in a variety of manners. In certain configurations, the method of measurement may affect the purported TDS content of a given extract. As the term is used herein, TDS refers to the proportion of solids dissolved within a given volume of extract and is thus expressed in mass/volume—typically g/L. Nevertheless, slight variations in methodology are contemplated, which may yield slightly different results. For instance, in certain configurations, TDS may be approximated by measuring the refractive index of the extract using a refractometer to approximate the proportion of dissolved solids as a percentage representing the proportion of dissolved solids within the total extract. Such variations remain within the scope of the present disclosure. As noted above, embodiments of the extraction methods described with respect to FIGS. 2A-E can be used to create the extracts described above. In addition, the embodiments of the extraction cell 200 described above can be used to create cold extracts according to the embodiments described above. In addition, in certain embodiments, the embodiments of the extraction cell 200 and the methods described with respect to FIGS. 2A-2E can be used in combination to create the extracts described above.

Extraction Cell Control Systems

In certain configurations, preparation of an extract as described above may proceed automatically, or may be performed substantially manually. In various configurations, one or more sensors may be disposed within, or adjacent to, the extraction cell to detect various characteristics of the extraction process. For instance, such sensors may detect various characteristics such as the temperature within the extraction cell, the temperature of the extraction cell itself, the pressure within the extraction cell, the volume of extraction material within the extraction cell, the volume of solvent within the extraction cell, the duration of extraction, the rate at which solvent is introduced through the inlet, the rate at which extract is retrieved through the outlet, or various other characteristics.

Figure 4:
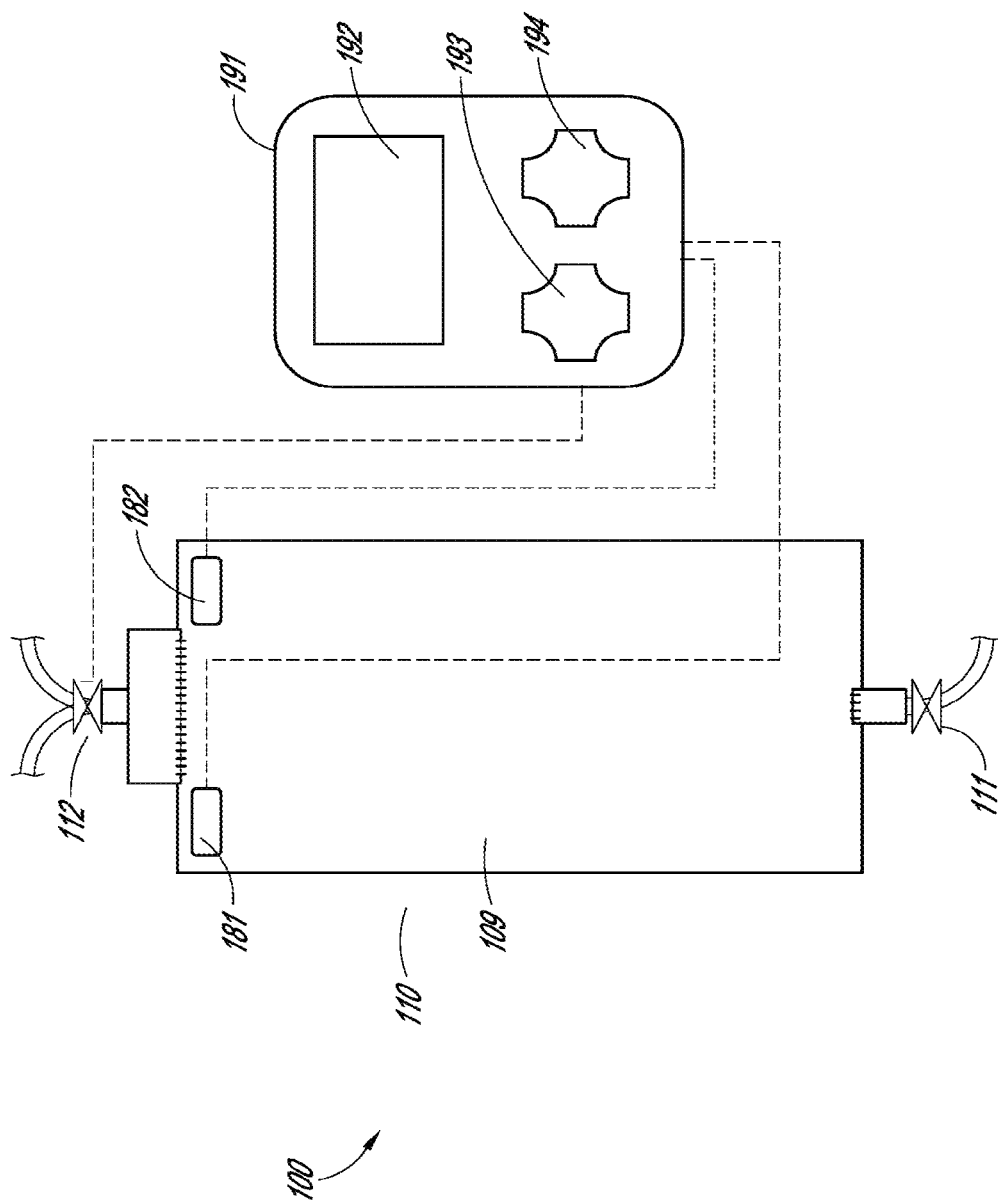
FIG. 4 is a schematic system of an extraction cell control system.

FIG. 4 depicts a schematic view of an extraction cell equipped with multiple sensors; a pressure sensor 181 and a temperature sensor 182. Each of the pressure sensor 181 and temperature sensor 182 are communicably coupled to a controller 191. Likewise, the inlet valves 111 and outlet valves 112 are also communicably coupled to the controller 191. In this manner, each of the pressure sensor 181, the temperature sensor 191, the inlet valves 111, and the outlet valves 112, may relay information to the controller 191.

As shown in FIG. 4, certain embodiments of the controller 191 may include a display apparatus, such as a screen 192. The screen 192 can display the aforementioned information gathered from the pressure sensor 181, the temperature sensor 182, the inlet valves 111, and the outlet valves 112. For instance, in embodiment illustrated in FIG. 4, the controller may display information obtained from the temperature sensor, such as the temperature within the extraction cell. Likewise, the controller may display pressure, such as the pressure within the extraction cell. As discussed above, the inlet valve 111 and the outlet valve 112 may also relay pertinent information to the controller 191 to be depicted on the screen 192. In this manner, the operator may view various extraction characteristics. Although a screen is illustrated in FIG. 4, alternate or additional display configurations may be employed, such as an analog gauge or alternative digital read out.

In certain configurations, the controller may further include one or more dials. In this manner, the operator may affect various extraction characteristics. For instance, in the embodiment depicted in FIG. 4, the controller 191 includes a first dial 193 and a second dial 194. However, the dials may be implemented in a variety of numbers or forms. For instance, in certain configurations the controller 191 may include one or more buttons or switches in place of the aforementioned dials.

With continued reference to FIG. 4, the first dial 193 may be manipulated to control, e.g., the outlet valves 112. Similarly, the second dial 194 may be manipulated to control, e.g., the inlet valves 111. In this manner, an operator of the extraction cell 100 may manipulate the first dial 193 to open the outlet valves 112, and further manipulate the second dial 194 such that a flow of solvent is allowed to enter the interior 109 of the extraction cell 100. In this manner, air or other gasses resident in the extraction cell may exit the interior 109 of the extraction cell 100 as the solvent begins to fill the chamber. In other embodiments, the first dial 193 may be manipulated such that the outlet valves 112 are closed as the solvent is introduced into the interior 109 of the extraction cell 100, allowing pressure to build within the chamber.

In additional embodiments, the controller 191 may be configured to automatically control certain extraction parameters. For instance, in certain configurations the controller 191 may be configured to receive information from at least one of the temperature sensor 181 and pressure sensor 182, and to automatically modulate inlet valve 111 or outlet valve 112 to control the temperature or pressure within the interior 109 of the extraction cell 100. In this manner, the extraction process may be substantially automated.

Certain Terminology

As used herein, the term "beverage" has its ordinary and customary meaning, and includes, among other things, any edible liquid or substantially liquid substance or product having a flowing quality (e.g., juices, coffee beverages, teas, milk, beer, wine, cocktails, liqueurs, spirits, cider, soft drinks, flavored water, energy drinks, soups, broths, combinations of the same, or the like).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. Numbers preceded by a term such as "about" or "approximately" include the recited numbers and should be interpreted based on the circumstances (e.g., as accurate as reasonably possible under the circumstances, for example. For example, "about 1 gram" includes "1 gram." In the embodiments described in this application, terms such as "about" or "approximately" within the specification or claims that precede values or ranges can be omitted such that this application specifically includes embodiments of the recited values or ranges with the terms "about" or "approximately" omitted from such values and ranges such that they can also be claimed without the terms "about" or "approximately" before the disclosed range. That is, this application specifically includes embodiments of values and ranges associated with for example, TDS, extraction medium temperature, steeping pressure, steeping time, diameter, yield, and flow rates with "about" or "approximately" associated with the disclosed values and ranges or without "about" or "approximately" associated with the disclosed values and ranges. Thus, for example, a disclosed range of between "about 0° C. and about 100° C." would include a disclosed range of between "0° C. and 100° C." which can be claimed as between "0° C. and 100° C.". The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

The following example embodiments identify some possible permutations of combinations of features disclosed herein, although other permutations of combinations of features are also possible.

In a first embodiment of the present disclosure, described is a method of preparing an extract, the method comprising: loading extraction material into an extraction cell having a bottom portion and a top portion; introducing a first aliquot of extraction medium through the bottom portion of the extraction cell; expelling gas from the extraction cell through the top portion of the extraction cell; closing the top portion of the extraction cell and increasing the pressure in the extraction cell as extraction medium flows into the bottom portion of the extraction cell; stopping the flow of extraction medium into the extraction cell; steeping the extraction material in the extraction medium under pressure to produce an extract; and introducing a second aliquot of extraction medium through the bottom portion of the extraction cell to push extract through top portion of the extraction cell.

In a second embodiment of the present disclosure, described is an extraction cell for preparing an extract, the extraction cell comprising a bottom portion; a top portion having a cross-sectional area; a side wall extending between the bottom portion and bottom portion; an inlet on the bottom portion for introducing an extraction medium; an outlet disposed on the top portion for removing an extract from the extraction cell, the outlet having an area that is between about 10 to about 100% of the cross-sectional area of the top portion of the extraction cell; and a filter positioned at the outlet having a mean aperture diameter between about 0.05 mm to about 0.35 mm.

In a third embodiment of the present disclosure, described is a cold extracted coffee and/or tea extract comprising a TDS of about 60 g/L and about 120 g/L, wherein the extraction medium used to produce the extract is maintained at a temperature less than about 30° C. until the extract is displaced from the extraction cell.

Any of the preceding first, second or third embodiments may be practiced alone, or in combination with one another. Slight variations on the foregoing are also contemplated. For instance, in conjunction with the preceding embodiments, or in still further embodiments, the extraction material may comprise ground roasted coffee beans or loose leaf tea. The ground coffee beans have a mean diameter of between 1 mm and 2 mm.

Likewise, according to any of the preceding first, second or third embodiments, the extract may have a TDS ranging from about 40 g/L to about 140 g/L. For instance, in certain configurations, the extract has a TDS of about 80 g/L to about 120 g/L. In the same or different embodiments or configurations, the extract may have a yield between about 8% and about 16%. In some embodiments described herein, TDS and yield are related. For instance, in some configurations, the extract has a TDS between about 80 g/L and 10 g/L, and a yield between about 8% and about 14%.

According to any of the preceding embodiments, the extraction medium may further have a temperature not exceeding 100° C., and in certain configurations, the extraction medium may be between 0° C. and 100° C. and in certain configurations, the extraction medium may be between 10° C. and 30° C. According to any of the preceding embodiments, the extraction material may be allowed to steep in the extraction medium under pressure and the maintained pressure within the extraction cell between about 0 bar(gauge) and about 16 bar(gauge). For instance, according to any of the preceding embodiments, the coffee or tea used to produce the extract is maintained at a pressure between about 0 bar(g) and about 16 bar(g) after the extraction medium is introduced into the extraction cell, until the extract is displaced from the extraction cell and in certain embodiments the pressure can be between about 0.8 bar(gauge) and 3 bar(gauge). In the same or different embodiments, the extraction material may be allowed to steep for between about 30 minutes and about 20 hours, such as between about 30 minutes and 90 minutes. In certain configurations, the coffee is exposed to an extraction medium for between about 45 minutes and 20 hours.

According to any of the foregoing embodiments, the extraction medium may be introduced through the bottom portion of the extraction comprising introducing the extraction medium at a flow rate that achieves plug flow. For instance, in certain configurations, the second aliquot of extraction medium is introduced at a rate such that about 30% to 90% of the first aliquot is displaced over a period of about 5 minutes to 30 minutes.

In the same or different embodiments or any of the above embodiments, a portion of the extract may be delivered to a consumer without subjecting the portion of extract to a further extraction process. Likewise, in the same or different embodiments, the extraction material has not been subjected to prior extractions.

According to any of the preceding embodiments, the filter of the extraction cell may have a mean aperture diameter of about 0.15 mm to about 0.35 mm. For instance, according to any of the foregoing embodiments, the diameter of the fine filter is about 15 to 40% of the diameter of an inner diameter the upper portion of the extraction cell.

Summary

Although this disclosure describes certain embodiments and examples of beverage systems and methods, many aspects of the above-described systems and methods may be combined differently and/or modified to form still further embodiments or acceptable examples. All such modifications and variations are intended to be included herein within the scope of this disclosure.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. The figures are drawn to scale, but such scale should not be interpreted to be limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of beverage dispensing systems and methods have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed:

1. A method of preparing an edible, coffee extract, the method comprising:
   loading an extraction material into an extraction cell having a bottom portion and a top portion;
   introducing a first aliquot of an extraction medium through the bottom portion of the extraction cell to form the edible, coffee extract; and
   introducing a second aliquot of the extraction medium through the bottom portion of the extraction cell to push the edible, coffee extract through the top portion of the extraction cell, wherein the edible, coffee extract is pushed through the top portion of the extraction cell after only a single pass through the extraction material,
   wherein introducing the second aliquot of the extraction medium through the bottom portion of the extraction cell comprises introducing the second aliquot of the extraction medium at a flow rate that achieves plug flow such that the first aliquot of the extraction medium and the second aliquot of the extraction medium do not substantially mix, wherein the extraction medium has a temperature less than about 30° C., and wherein the edible, coffee extract has a TDS between about 40 g/L to about 140 g/L, wherein the extraction material comprises extraction material that not been subjected to prior extractions.

2. The method of claim 1, wherein the extraction material comprises ground roasted coffee beans.

3. The method of claim 1, wherein the first aliquot and the second aliquot of extraction medium are each flowed into the extraction material in the extraction cell.

4. The method of claim 1, wherein the first aliquot and the second aliquot of extraction medium are each introduced directly from an inlet to the bottom portion of the extraction cell, wherein the inlet is fitted with a filter.

5. The method of claim 1, wherein introducing the first aliquot of extraction medium through the bottom portion of the extraction cell comprises introducing the first aliquot of extraction medium at a constant flow rate across a radial axis of the extraction cell.

6. The method of claim 1, wherein the edible, coffee extract has a yield between about 8% and about 16%.

7. The method of claim 1, wherein the extraction medium is water.

8. The method of claim 1, wherein the second aliquot of the extraction medium is introduced at a rate such that about 30% to 90% of the first aliquot is displaced over a period of about 1 minute to about 2 hours.

9. The method of claim 1, wherein the extraction material used to produce the edible, coffee extract is maintained at a pressure between about 1 bar(g) and about 16 bar(g) after the first aliquot is introduced into the extraction cell, until the edible, coffee extract is pushed from the extraction cell.

10. The method of claim 1, wherein the extraction material to produce the edible, coffee extract is exposed to the extraction medium for between about 3 minutes to 30 minutes.

* * * * *